United States Patent Office 3,051,732
Patented Aug. 28, 1962

3,051,732
16-SUBSTITUTED EQUILENIN DERIVATIVES
Marcel Harnik, Morristown, Tenn., assignor to Chemetron Corporation, Chicago, Ill., a corporation of Delaware
No Drawing. Filed Aug. 16, 1961, Ser. No. 131,728
9 Claims. (Cl. 260—397.4)

This invention relates to equilenin compounds of the following general formula and to the production thereof;

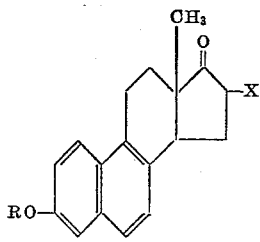

wherein X is a trifluoroacetyl, trifluoroethyl or trifluoroacyloxyethylidene radical and R is hydrogen, a lower alkyl radical or a lower alkanoyl radical.

The compounds of this invention have adrenocortical activity and are useful in the relief of inflammation of rheumatoid arthritis and similar collagen and allergic conditions, without undesirable estrogenic, antiestrogenic or antiandrogenic effects. They have particular utility in inducing thymolytic corticoid activity in mammals and can be applied parenterally in aqueous suspensions or in innocuous organic solvents. They are thus useful in supplementing the cortical hormone production of mammals without the side effects of the progestational hormones. These compounds are also useful as intermediates in the synthesis of adrenocorticoid compounds.

In the compounds of the foregoing formula, R can represent hydrogen or lower alkyl radicals, such as methyl, ethyl, propyl, isopropyl or butyl radicals, or lower alkanoyl radicals such as formyl, acetyl, propionyl or butyryl radicals. The substituent X can represent the trifluoroacetyl radical and derivatives thereof such as trifluoroethylidene, trifluoroethyl, acetoxytrifluoroethylidene and similar aliphatic radicals containing three fluorine atoms.

It is an object of this invention to provide new equilenin compounds which have useful physiological activity. It is a further object to provide efficient methods for producing such compounds from available steroids. Another object is to provide equilenin compounds having fluorinated aliphatic radicals in the 16-position which are useful as adrenocorticoids. These and other objects are apparent from and are achieved in accordance with the following disclosure.

The compounds of this invention are produced from equilenin. The first step is the condensation of equilenin with an alkyl ester of trifluoroacetic acid in the presence of an alkaline condensing agent such as an alkali metal hydride or an alkali metal alkoxide in an inert solvent. The condensation is preferably conducted in a nonoxidizing atmosphere at a temperature in the range of 50–150° C. By this procedure a trifluoroacetyl radical is introduced at the 16-position of equilenin. The trifluoroacetyl-equilenin can then be reacted with an alkanoic acid anhydride, preferably in the presence of a basic solvent such as pyridine, quinoline or dimethylaniline, to form an enol alkanoate from the β-diketone which is formed by the introduction of the substituted acetyl radical at the 16-position of the equilenin. The enol alkanoate can be hydrogenated in the presence of a noble metal catalyst whereby the double bond at the 16-position is reduced and the adjacent acyloxy radical is removed, thereby forming a trifluoroethyl substituent in the 16-position of the steroids shown in the general formula above.

The invention is disclosed in further detail by means of the following examples which are provided to illustrate the invention without limiting it thereto. It will be apparent to those skilled in the art that various modifications in reaction conditions, reagents and equivalent materials can be made without departing from the invention herein disclosed.

EXAMPLE 1

16-Trifluoroacetyl-3-Methoxy-1,3,5(10),6,8(9)-Estrapentaene-17-One

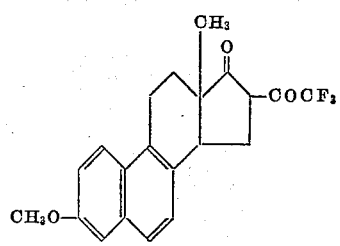

A mixture of 500 mg. of equilenin methyl ether and 650 mg. of sodium methoxide in 50 ml. of dry benzene containing 2 ml. of ethyl trifluoroacetate was refluxed under nitrogen for 2 hours. The reaction mixture was cooled and acidified with cold 5% hydrochloric acid. The benzene layer was separated, washed with water and with saturated NaCl solution, dried and evaporated. 16-trifluoroacetyl-3-methoxy - 1,3,5(10),6,8(9)-estrapentaene-17-one formed a red crystalline solid. Its I.R. absorption spectrum had peaks at 5.89 and 6.12 microns.

EXAMPLE 2

16-(2,2,2-Trifluoro-1-Acetoxyethylidene)-3-Methoxy-1,3,5(10),6,8(9)-Estrapentaene-17-One

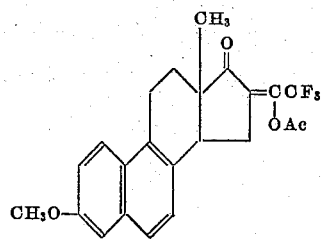

A. One-third of the 16-trifluoroacetyl - 3 - methoxy-1,3,5(10),6,8(9)-estrapentaene-17-one produced in Example 1 was refluxed with 5 ml. of acetic anhydride for 30 minutes. The mixture was evaporated in vacuo and a solid residue of 16-(2,2,2-trifluoro-1-acetoxyethylidene)-3-methoxy-1,3,5(10),6,8(9)-estrapentaene-17-one was obtained. After washing with cold methanol, it melted at 196–207° C.

B. One-third of the 16-trifluoroacetyl - 3 - methoxy-1,3,5(10),6,8(9)-estrapentaene-17-one of Example 1 was refluxed 16 hours with 15 ml. of isopropenyl acetate and 30 mg. of p-toluenesulfonic acid. The cooled reaction mixture was dissolved in ether and the solution was washed with sodium bicarbonate solution and with saturated NaCl solution, dried and evaporated. The 16-(2,2,2-trifluoro - 1 - acetoxyethylidene) - 3 - methoxy-1,3,5(10),6,8(9) - estrapentaene - 17-one, after a methanol wash, melted at 203–208° C.

C. One-third of the 16-trifluoroacetyl-3-methoxy-1,3,5(10),6,8(9)-estrapentaene-17-one of Example 1 was dissolved in a mixture of 2 ml. of pyridine and 2 ml. of acetic anhydride and the mixture allowed to stand for 16 hours. It was then evaporated under reduced pressure and afforded a quantitative yield of 16-(2,2,2-trifluoro-1-acetoxyethylidene) - 3 - methoxy - 1,3,5(10),6,8(9)-estrapentaene-17-one of M.P. 200–205° C.

The three products obtained in A, B and C had identical spectra. They were combined and recrystallized from 10 ml. of ethyl acetate to afford 318 mg. of 16-(2,2,2-trifluoro-1-acetoxyethylidene) - 3 - methoxy - 1,3,5(10),6,8(9)-estrapentaene-17-one of M.P. 208–211° C. Further recrystallization raised the M.P. to 213° C. The I.R. absorption spectrum of the product had peaks at 5.89, 6.12, 6.22 and 6.34 microns.

EXAMPLE 3

*16-(2,2,2-Trifluoroethyl)-3-Methoxy-1,3,5(10),6,8(9)-Estrapentaene-17-One*

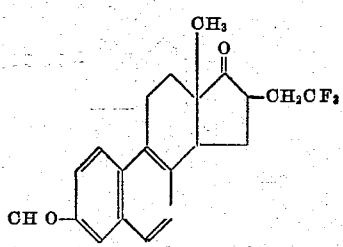

621 mg. of 16-(2,2,2-trifluoro-1-acetoxyethylidene)-3-methoxy-1,3,5(10),6,8(9)-estrapentaene-17-one in 50 ml. of methanol containing 5 drops of triethylamine was hydrogenated in the presence of 500 mg. of palladium-charcoal catalyst at atmospheric pressure and temperature for 40 minutes. The catalyst was removed by filtration and washed with chloroform to dissolve the product which had precipitated. The combined filtrate and washings were evaporated to give solid 16-(2,2,2-trifluoroethyl-3-methoxy - 1,3,5(10),6,8(9) - estrapentaene-17-one. After recrystallization from methanol-ethyl acetate a yield of 386 mg. of the foregoing compound of M.P. 167–168.5° C. was obtained. Further recrystallizations raised the M.P. to 184–185° C. The I.R. absorption spectrum (in KBr) had a peak at 5.73 microns, indicating a carbonyl group in five-membered ring.

The 3-methoxyl substituent can be cleaved to the corresponding 3-hydroxyl substituent by refluxing 16-(2,2,2-trifluoroethyl) - 3 - methoxy - 1,3,5(10),6,8(9) - estrapentaene-17-one in acetic acid containing 10% HCl. The product has the formula

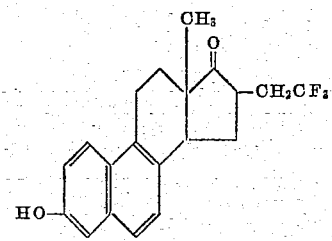

It can be acetylated with acetic anhydride in anhydrous pyridine to 16-(2,2,2-trifluoroethyl)-3-acetoxy-1,3,5(10),6,8(9)-estrapentaene-17-one.

What is claimed as new and is desired to be secured by Letters Patent of the United States is:

1. A steroid of the general formula

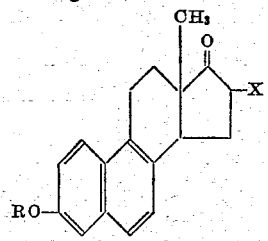

wherein R is a member of the group consisting of hydrogen, lower alkyl and lower alkanoyl radicals and X is a member of the group consisting of trifluoroacetyl, trifluoroethylidene, trifluoroethyl and acetoxytrifluoroethylidene radicals.

2. A steroid as defined by claim 1 wherein R is lower alkyl and X is trifluoroacetyl.

3. A steroid as defined by claim 1 wherein R is methyl and X is trifluoroacetyl.

4. A steroid as defined by claim 1 wherein R is lower alkyl and X is trifluoroethyl.

5. A steroid as defined by claim 1 wherein R is methyl and X is trifluoroethyl.

6. A steroid as defined by claim 1 wherein R is lower alkyl and X is acetoxytrifluoroethylidene.

7. A steroid as defined by claim 1 wherein R is methyl and X is acetoxytrifluoroethylidene.

8. A steroid as defined by claim 1 wherein R is hydrogen and X is trifluoroethyl.

9. A steroid as defined by claim 1 wherein R is acetyl and X is trifluoroethyl.

No references cited.